T. K. ALEXANDER.
Corn-Planter.
No. 43,559.   Patented July 19, 1864.
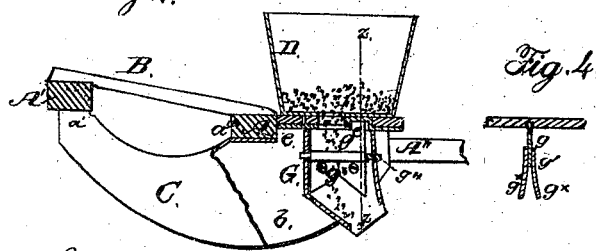
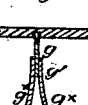
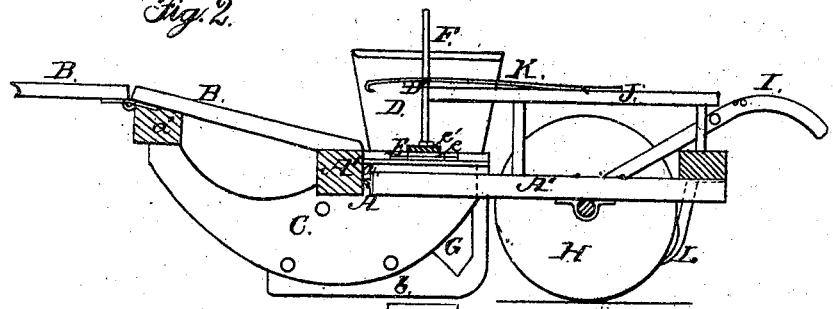
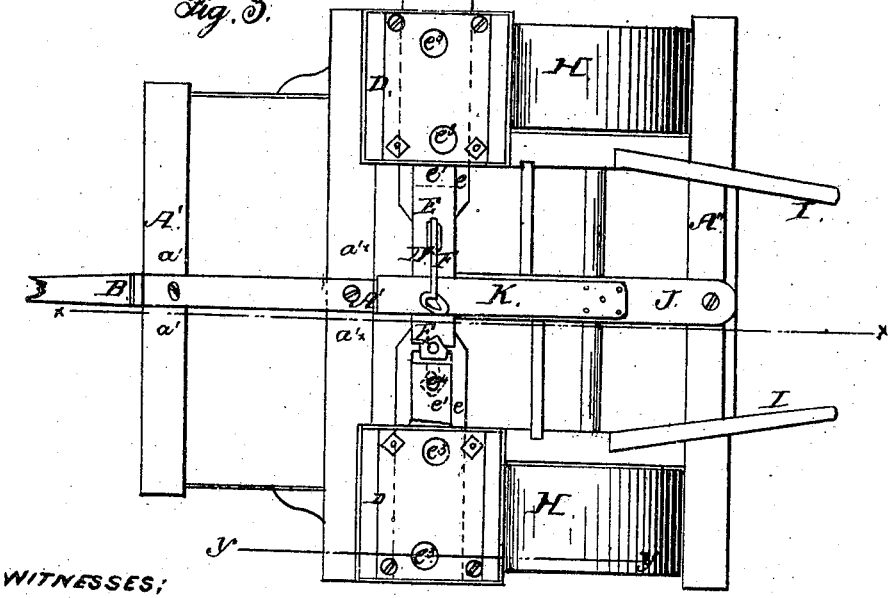
WITNESSES:
INVENTOR:

UNITED STATES PATENT OFFICE.

THOMAS K. ALEXANDER, OF DECATUR, ILLINOIS.

CORN-PLANTER.

Specification forming part of Letters Patent No. 43,559, dated July 19, 1864.

*To all whom it may concern:*

Be it known that I, THOMAS K. ALEXANDER, of Decatur, in the county of Macon and State of Illinois, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of the seed-distributing mechanism, the line $x\ x$, Fig. 3, indicating the plane of section. Fig. 2 is a longitudinal vertical section of the corn-planter, taken in the plane indicated by the line $y\ y$, Fig. 3. Fig. 3 is a plan or top view of the same. Fig. 4 is a transverse vertical section of the double valve in the discharge-tube detached, the line $z\ z$, Fig. 1, indicating the plane of section.

Similar letters of reference in the several views indicate corresponding parts.

This invention relates to an improvement in that class of corn-planters in which the seed is discharged by the action of a double-acting slide simultaneously from two hoppers in furrows opened by sleigh-runner-shaped shares, and covered by two broad wheels with flat faces.

The nature of my invention and its peculiar advantages will be readily understood from the following description.

A represents a frame made of wood or any other suitable material, and composed of two parts, A' and A'', which are connected by hinges $a$. The front part, A', consists of two cross-beams $a'\ a'^*$, which are united by the draft-pole B and by the runners C. The runners C extend beyond the rear edge of the cross-bar $a'^*$, and their front parts form curved colters, which serve to open the ground and to cut through weeds and other obstructions. Their rear ends are provided with flanged mold-boards $b$, which are secured to the outsides of the runners, and which throw the dirt toward the outside. The width of the furrow is determined by the oblique position of these mold-boards and by the distance between their rear ends and those of the colter-plates. The mold-boards are curved in a peculiar manner, so that they are self-cleaning.

D D are two hopper-boxes, which are supported by the rear ends of the runners. The seed or corn contained in these hoppers is discharged by the action of slides E, to which a reciprocating motion is imparted simultaneously by a hand-lever, F. Each of these slides is composed of two essential plates, $e\ e'$, the outer or main plate, $e$, being provided with a recess, $e^*$, to receive the inner or gage plate, $e'$, and the two plates are connected by a screw, $e''$, which works in a slot, so that the gage-plate $e'$ can be adjusted backward and forward at pleasure. By these means the seed-cells $e^3$ can be enlarged or diminished at pleasure. On being discharged from the seed-cells the seed drops into a tube, G, which is provided with a valve, $g$. This valve swings on a rock-shaft, $g'$, and its upper end catches into a recess in the seed-slide, so that an oscillating motion is imparted to it by the action of the seed-slide. The lower part of the valve branches off in two wings, $g^*$, (see Fig. 4,) which form springs, and as the seed-slides are moved backward and forward these springs form cushions which prevent the slides working up solid against the hoppers, spraining the wrist of the man who operates the slides. The lower edges of the elastic wings or springs $g^*$ are scalloped or W-shaped, so that the seed striking the points is scattered on the ground and prevented from dropping in a pile. The tubes G G extend down from the hoppers in the space between the rear ends of the colter-plates and mold-boards, so that they are fully protected from clogging up by the dirt, and the seed is deposited without fail at every stroke of the slide in the furrow drawn by the runners. The two hoppers are connected by the cross-bar D*, which is perforated with suitable holes to admit the hand-lever F.

The hinges $a$, which connect the two parts A' A'' of the frame, are situated forward of the hoppers and main weight of the runners, so that by the joint the runners are enabled to follow the uneven ground without effect on the rollers or covering-wheels H. By means of the joint the plows can also be raised entirely out of the ground in going from one field to another or in turning. The rear part of the frame, which is supported by the axle of the covering-wheels, is provided with two handles, I, which enable the driver to govern the motion and position of the planter while he is walking on the ground.

J is the driver's seat, which extends behind the rollers or covering-wheels, and a spring-hook, K, which is secured to the upper surface of the driver's seat, bears down upon the cross-bar D*, connecting the two hoppers, and by this spring-hook the relative position of the two parts A' A" of the frame toward each other is governed. If the driver slides back on the seat so as to throw his weight on the rollers, the front part of the frame is tilted until the edge of the cross-bar D* strikes the hook K, and the same object can be accomplished by bearing down on the handles I. In planting the driver will walk and direct the motion and the position of the planter by the handles, in order to make the work easier for the draft-animals.

The covering-wheels are kept clean by scrapers L, secured to the under surface of the rear cross-bar of the frame.

The operation of this planter is very easy. It can be readily adjusted for seed of different kind, and all its parts are so constructed that the same do not readily get out of repair.

What I claim as new, and desire to secure by Letters Patent, is—

The spring-hook K, in combination with the hinges a, connecting the two parts of the frame A, as and for the purpose specified.

THOS. K. ALEXANDER.

Witnesses:
O. C. STAFFORD,
I. C. MILLSPAUGH.